US012702180B2

(12) United States Patent
Coyle et al.

(10) Patent No.: US 12,702,180 B2
(45) Date of Patent: Aug. 11, 2026

(54) HELMET ROTATION DAMPING WITH NEGATIVE TORQUE

(71) Applicant: Brian Michael Coyle, Canyon, CA (US)

(72) Inventors: Brian Michael Coyle, Canyon, CA (US); Alys Larsen, Canyon, CA (US)

( * ) Notice: Subject to any disclaimer, the term of this patent is extended or adjusted under 35 U.S.C. 154(b) by 136 days.

(21) Appl. No.: 18/135,612

(22) Filed: Apr. 17, 2023

(65) Prior Publication Data

US 2023/0248104 A1 Aug. 10, 2023

Related U.S. Application Data

(63) Continuation-in-part of application No. 17/845,780, filed on Jun. 21, 2022, which is a continuation of application No. 16/689,086, filed on Nov. 20, 2019, now Pat. No. 11,464,270.

(60) Provisional application No. 62/774,686, filed on Dec. 3, 2018.

(51) Int. Cl.

| | |
|---|---|
| ***A42B 3/06*** | (2006.01) |
| ***A42B 3/04*** | (2006.01) |
| ***A42B 3/12*** | (2006.01) |
| *F16F 15/03* | (2006.01) |

(52) U.S. Cl.
CPC ............ *A42B 3/064* (2013.01); *A42B 3/0486* (2013.01); *A42B 3/125* (2013.01); *F16F 15/03* (2013.01)

(58) Field of Classification Search
CPC ....... A42B 3/064; A42B 3/0486; A42B 3/125; F16F 15/03
See application file for complete search history.

(56) References Cited

U.S. PATENT DOCUMENTS

| | | | | |
|---|---|---|---|---|
| 5,564,421 | A * | 10/1996 | Ehnholm | G01R 33/345 324/318 |
| 9,962,555 | B1 * | 5/2018 | Charles | A61N 2/06 |
| 9,999,263 | B2 * | 6/2018 | Yoon | A41D 13/0002 |
| 10,034,511 | B1 * | 7/2018 | Bulat | A63B 71/10 |
| 10,165,806 | B2 * | 1/2019 | Duncan | A42B 3/0486 |
| 10,315,559 | B2 * | 6/2019 | Hammock | B60Q 1/445 |
| 10,433,033 | B2 * | 10/2019 | Touma | A63B 24/0062 |

(Continued)

*Primary Examiner* — Khaled Annis

(57) ABSTRACT

The present invention is a helmet system that reduces concussions by damping rotational force transmitted to a helmet user. The helmet has an helmet shell that moves independently from an internal body worn by the user. At least one magnetic force emitter on the helmet shell's interior directs at least one interior-facing magnetic flux axially at the internal body. At least one magnetic force emitter attached to the internal body directs at least one exterior-facing magnetic flux at the at least one interior-facing magnetic flux. In a resting state magnetic flux interactions are limited. When a tangential impact rotates the exterior shell, the at least one interior-facing magnetic flux approaches to the side of the at least one exterior-facing magnetic flux, inducing negative torque of the internal body in a variety of ways. Rotational momentum is diffused in a variety of ways. The exterior shell is returned to the resting state in a variety of ways. A sensor may be contained on the internal body to detect magnetic flux acceleration of the exterior shell, and may store or transmit data, and may trigger an airbag around the user's neck, or reduce helmet shell motion, or return the helmet shell to the resting state.

6 Claims, 12 Drawing Sheets

(56) References Cited

U.S. PATENT DOCUMENTS 10,582,883 B2 * 3/2020 Benzel .................. A61B 5/682
10,681,952 B2 * 6/2020 Kennard ................ A42B 3/064
10,702,001 B2 * 7/2020 Morgan .................. A42C 2/00
10,709,191 B2 * 7/2020 Howard .................. A42B 3/06
10,750,797 B2 * 8/2020 Yoon ..................... A42B 3/125
11,046,241 B2 * 6/2021 Hammock .......... B60Q 1/0094
11,058,164 B2 * 7/2021 Mustapha ............. A42B 3/064
11,178,930 B2 * 11/2021 Kovarik ................. A42B 3/20
11,497,964 B1 * 11/2022 Hunter ................. A63B 53/005
2006/0084857 A1 * 4/2006 Massengill ........... G01R 33/28
600/407
2008/0282453 A1 * 11/2008 Alstin ................ A41D 13/0512
2/468
2013/0185837 A1 * 7/2013 Phipps ................ A42B 3/0453
2/2.5
2013/0276213 A1 * 10/2013 Olsson ................... A42B 3/122
2/468
2014/0000012 A1 * 1/2014 Mustapha ................ H01F 7/02
2/414
2014/0215693 A1 * 8/2014 O'Gara .................. A42B 3/069
2/410
2016/0113348 A1 * 4/2016 Twardowski, Jr. ... F41H 5/0492
2/412
2016/0120238 A1 * 5/2016 Duncan ............. A63B 71/1291
2/462
2016/0143383 A1 * 5/2016 Allen ..................... A42B 3/046
2/413
2016/0270472 A1 * 9/2016 Allen ..................... A42B 3/122
2017/0143054 A1 * 5/2017 Yoon ........................ A42B 3/32
2018/0110281 A1 * 4/2018 Morgan ................. A42B 3/064
2020/0085128 A1 * 3/2020 Coyle .................. A42B 3/0486
2020/0139913 A1 * 5/2020 Wendelrup .............. B60R 21/01
2020/0154813 A1 * 5/2020 Wendelrup ............... A42B 3/00
2020/0154814 A1 * 5/2020 Wendelrup ........... A41D 13/018
2020/0170328 A1 * 6/2020 Yan ........................ A42B 3/046
2022/0330645 A1 * 10/2022 Coyle .................. A42B 3/0486
2023/0248104 A1 * 8/2023 Coyle .................... A42B 3/064
2/411

* cited by examiner

HELMET ROTATION DAMPING WITH NEGATIVE TORQUE

PARENT TEST CASE

This patent application is a continuation-in-part of the co-pending U.S. patent application Ser. No. 17/845,780 filed Jun. 21, 2022, and entitled “ROTATION DAMPING HELMET”, which is hereby incorporated by reference in its entirety, which is a continuation of U.S. application Ser. No. 16/689,086 filed Nov. 20, 2019, now U.S. Pat. No. 11,464,270, which is hereby incorporated by reference in its entirety, and which claims priority from U.S. Provisional Patent Application Ser. No. 62/774,686 filed on 3 Dec. 2018, which is hereby incorporated by reference in its entirety. Nonpatent information considered by the Office in the parent applications is noted herein with parenthetical author names and date. MPEP 609.02 discourages applicants from resubmitting copies of PTO/SB/08 forms from other applications.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

The present invention relates to helmets for athletes, motorcycle riders, military personnel, and others who suffer head collisions. Most have hard shells, with shock absorbing elements or materials inside. The hard shell component resists breakage on impact, to maintain internal helmet structure, but does little to reduce the frequency and amplitude of impact shock.

Most helmet developments involve shock absorbing elements within the hard shell. When athletic players' heads collide, they decelerate, which causes G force increase. This is determined by the velocity of each head and helmet, their mass and scale, and angle and location of collision. Impact shock is attenuated by extending deceleration time. This typically involves deformation of passive material in the helmet, such as foam, as the head in the helmet compresses it. Newer helmet designs also use changes in element geometry, such as columns that bend to absorb energy. Altered internal segment stiffness, temporary or permanent, attenuates impact shock, head compression and linear acceleration.

Concussions, not skull bruising and fractures, are what threaten the very existence of American football as it is currently constituted. Concussions are also linked to the brain and psychological damage generated by explosion pressure waves and vehicle crashes. Concussions are induced by torque and rotation of the head, not compression and linear acceleration. Current helmets do not prevent concussions, because they aren't designed to. Most U.S. football helmet designs are not tested properly.

The U.S. military began G force impact research in the 1950s. Testing was needed to identify human capacities and limits. After human volunteers determined acceleration and deceleration thresholds, artificial mannequins were used, called crash test dummies, to gather evidence about human response to automobile impacts. Improved car safety correlates with data collection from these experiments. Safety engineers developed mannequins as passive robotic systems, which mimicked human centers of gravity and skeletal articulation, with dense data capture across the body. This led, for example, to careful analysis of side impacts, which induce neck flexion implicated in rapid head rotations. Evidence from tests led to side impact airbag development (Xu, Tao, 2018.)

Since 2000, scientific research into football collisions has increased. Finite element analysis, combined with cadaver testing, found significant correlation between high-angular rotational velocity and intracerebral acceleration. Rotational acceleration may cause acute subdural haematoma (Kleiven, S., 2006.)

Crash test dummies are now used in recreations of videotaped or common football impacts. Their metrics inform medical evaluation of athletes to determine if they have suffered a concussion. This is vital to increasing concussion awareness, and has helped delay reintroduction of potentially concussed athletes in games. Yet the most common assessment standards do not reference rotational forces. Recently, sensors applied to players in practice and in games detect head acceleration forces (Hanlon E. M. & Bir, C. A., 2012.) Given vibration, friction, clothing, and general athletic environments, results exhibit great variation. Reports of G forces recorded by sensors in similar collisions may range up to an order of magnitude (Higgins, M. et al., 2007.) Many sensor systems measure linear more easily than angular or rotational acceleration, leading some to erroneously conclude that head rotations are rare in football collisions (O'Connor, K. L. et al., 2017.)

Automotive laboratory testing was aided by clear, measurable vehicle attributes: velocity, direction, mass, and impact zones. This gave safety engineers an exact framework within which to assess human physical response. The framework of contact sports is inherently more nebulous and difficult to specify, not just in the field, but in the lab. Player velocity is much lower than cars, so small differences and measurement error increase uncertainty. Body parts have different velocities, with different impact contributions. The mass that governs impact deceleration is also difficult delimit in a player, since only part of an upright body is involved in horizontal collisions. An entire car's mass is implicated in an auto crash. In U.S. football, collision mass may include part of, or the entirety of, the head and helmet, or include the neck, neck and shoulders, or perhaps even more of a lunging body.

Although an automobile crash test can execute precise impact scenarios, forensic examinations of real-world car crashes also have large uncertainties. This is similar to assessing collision response from players wearing sensors during games. Laboratory auto crash tests are influenced by real world examples, and forensic interpretation of car crashes are informed by lab test data. But engineered safety elements in cars primarily address laboratory crash test results (Isaksson-Hellman & Norin, 2005.)

At the most basic level, helmet impact tests need to focus on real-world head responses, not helmet responses. Automobile safety advanced because researchers studied the response of humans in accidents, not cars. The U.S. football helmet industry, on the other hand, tests helmets by dropping heavy weights on them, or dropping the helmet on hard surfaces. This tests whether the helmet breaks, not the head's response (Hirad & Mahon, 2019.) If cars were evaluated like football helmets, they would be still be rigid boxes, rather than have strategically crumpling engine compartments that protect occupants. Airbags might not be developed.

Professional boxing discovered concussions are induced by torque and rotation of the head, not compression of the skull, over 80 years ago. Boxers are told to build strong neck muscles to dampen potential rotation, an appropriate, if inadequate, adaptation (Collins, C. L., et al., 2014.)

Punch someone straight on, and they may feel pain and suffer skeletal fractures, but won't pass out. Animal and even bird brains absorb linear force without concussing, as studies of woodpeckers show. Hit someone at an angle on the jaw, or on the side of the head, and it will cause the head to rotate rapidly, which induces brain movement that leads to concussive knockouts. In 1943 Holbourn determined that shearing forces in deep brain areas resulted from violent rotational movements. Rotations can stretch and tear neurons and even blood vessels. That causes concussions and, if severe enough, loss of consciousness (Holbourn, A. H. S., 1943.)

In the last decade, finite element analysis has been used to model high-angular rotational velocity and intracerebral acceleration, and can be used for helmet testing (Teng, T-L, et al., 2012.)

Solutions to head rotation concussions have not been incorporated in helmets that require active rotational damping, due to the fact that current helmets lack important novel improvements and modifications as in this patent application and described in co-pending U.S. patent application Ser. No. 17/845,780, titled "ROTATION DAMPING HELMET" (herein called the "RDH") and prior U.S. application Ser. No. 16/689,086 which is now U.S. Pat. No. 11,464,270, including systems that arrange very small magnets in three-dimensional arrays, these magnet arrays herein called "magnetic force emitters", to amplify magnetic flux in a single direction, minimizing magnetic force emitter scale while maximizing magnetic flux-induced negative torque which dampens transmission of rotational force to a wearer of the RDH, of which this application is a continuation-in-part. The invention described herein illustrates concepts present in the original specification, demonstrating practical applications that render the invention clearer. A novel nonobvious element is introduced, a small metal ring to absorb magnetic eddy fields, which is not in the original specification.

SUMMARY OF THE INVENTION

It is an object of the present invention to provide a helmet that dampens rotational forces transmitted to the head of the helmet wearer, including those rotations above threshold "rotations per minute" that predictably cause concussions, by providing an equipment system that overcomes the limitations of prior art. The system, which will be described subsequently in detail, provides an exterior shell with impact resistant material and structures, and an internal body that directly surrounds the wearer's head. The impact absorbing material and structures attached to the helmet shell's inner surface are configured with one or more magnetic force emitters that direct a magnetic flux of a given polarity axially inwards. The exterior shell pitches, rolls, and yaws independently of the internal body. One or more magnetic force emitters are arrayed on the internal body configured to direct a magnetic flux axially outwards.

In this application, the phrases "internal body," "body," and "head cover" refer to any structure that is positioned around a person's head, in closer proximity to the head than any other structure or object. The phrases "helmet shell," "external shell," "exterior helmet," and "exterior shell" are equivalent references to any structure that surrounds a person's head, more distal to the head than any other structure or object. The phrases "wearer," "user," "helmet wearer," helmet user", and "player" are equivalent references to a person on whom the RDH is positioned. In particular, the RDH is positioned around the person's head. A tangential impact of the helmet shell causes "rotational and translational acceleration", however this may be summarily referred to as "rotational acceleration" or other terms such as "rotational acceleration energy," "rotational forces," "rotationally accelerates," "tangential acceleration" and "tangential force," all of which refer to momentum movement of the helmet shell that is not directly towards the center of a user's head. The term "adjustment mechanism" refers to a structure composed of any of wedges, shafts, surfaces that mate, pistons, hinges, spring-like elements, and/or shape-changing polymers. The phrase "magnetic force emitters" refers to compound magnets generally composed of very small magnets, each magnet with a diameter less than 5 mm, preferably less than 3 mm, as specified in U.S. Pat. No. 11,464,270. A "magnetic force emitter" may be a single piece of magnetic material that is manufactured in a such a way that it is composed of multiple discrete magnetic fields with different orientations, recreating a similar effect as a compound structure of multiple very small magnets.

In accordance with the RDH invention, the present invention provides methods, components, modalities, and systems for damping rotational acceleration energy transmitted to a user's head to prevent moderate concussive damage to the user while maintaining a helmet's configuration for continued use, and providing fail-safe protection to prevent severe concussive damage to the user. In accordance with the present invention, there are provided methods wherein one or more external magnetic force emitters are attached to an exterior shell and one or more internal magnetic force emitters are attached to an internal body. Further examples of how these magnetic force emitters may dampen transmission of rotational forces though negative torque include, but are not limited to: configuring a first external magnetic force emitter with a first interior-facing magnetic flux with a polarity, and configuring a first internal magnetic force emitter with a first exterior-facing magnetic flux with the same polarity, the interior-facing and exterior-facing magnetic fluxes in axial alignment, though no repulsive force interactions need be present, and when the exterior shell suffers a tangential impact it moves in a tangential direction, moving the first interior-facing magnetic flux towards a second exterior-facing magnetic flux of a second internal magnetic force emitter that is adjacent, though at some distance, to the first internal magnetic force emitter, the second exterior-facing magnetic flux having a magnetic polarity that is opposite of the polarity of the first exterior-facing magnetic flux and is also opposite of the polarity of the first interior-facing magnetic flux, and as the helmet rotates the first interior-facing magnetic flux may attract the second exterior-facing magnetic flux while simultaneously repulsing the first exterior-facing magnetic flux, the combined magnetic interactions amplifying negative torque of the internal body, which dampens rotational acceleration force transmitted to the internal body.

Still further in accordance with the RDH invention, external magnetic force emitters and internal magnetic force emitters are preferably positioned at least 2.5 centimeters from neighboring magnetic force emitters on the same surface. Even more preferably neighboring magnetic force emitters are at least 5.0 or more centimeters from each other. Even more preferably an embodiment may have a single magnetic force emitter attached to the helmet shell. Even more preferably an embodiment may have a single magnetic force emitter attached to the internal body. Even more preferably an embodiment may have two or more magnetic force emitters attached to the helmet shell. Even more preferably an embodiment may have two or more magnetic force emitters attached to the internal body.

Still further in accordance with the RDH invention, there are provided methods for measuring the rotational acceleration of an exterior shell that has suffered a tangential impact, by use of one or more motion sensors on the internal body that detect the acceleration of the interior-facing magnetic flux of the external magnetic force emitters. A motion sensor may be a Hall effects sensor, or other sensors such as position, velocity, accelerometer, or gyroscopic devices. A Hall effects sensor has no moving parts, no energy requirement, is robust, and is well suited to detect magnetic flux. An exterior shell that includes magnetic fluxes extending axially inwards is uniquely configured for producing flux used in measuring acceleration. One or more motion sensors may transmit data to a controller that may store, compare, process, and/or communicate the data.

Still further in accordance with the RDH invention, a motion sensor communicates with a controller, where thresholds of directional velocity predicted to have a significant risk of concussion are compared. The controller may trigger gas, fluid, or another agent to rapidly fill an airbag or other immobilizing structure around an RDH user's neck, or otherwise disposed, which instantly expands and prevents the head from rotational movement, a fail-safe system to prevent severe concussions.

Still further in accordance with the RDH invention, a motion sensor communicates with a controller, where a logic element calculates directional motion of the interior-facing magnetic flux of the external magnetic force emitters. The logic element may power a motor or energy source that causes an one or more adjustment mechanisms to change configuration. The adjustment mechanisms may be composed of shape-changing polymers, hinges, pistons, wheels, or spring-like elements. The mechanism's base is attached to a surface attached to a user, and the mechanism's top portion is attached to the helmet shell. The configuration change reduces the helmet shell directional motion.

Still further in accordance with the RDH invention, negative torque of the internal body is produced by the at least one interior-facing magnetic flux and the at least one exterior-facing magnetic flux that are in axially alignment in a resting state in an embodiment wherein the axially aligned magnetic fluxes are of opposite polarities. The at least one external magnetic force emitter is housed in a unit in which it rotates, and the at least one internal magnetic force emitter is housed in a unit in which attached to a component that rotates and is connected to the internal body. After a tangential impact the interior-facing magnetic flux approaches a side of the exterior-facing magnetic flux and the external magnetic force emitter rotates towards the exterior-facing magnetic flux, and the component attached to the internal magnetic force emitter allows it to rotate towards the interior-facing magnetic flux which pushes the internal body to produce negative torque.

In a further embodiment, there are presented restoration modalities for returning the exterior shell to a resting state after its rotation induced by an impact, which is necessary for practical use. In an embodiment a restoration modality is composed of tension absorbing components with spring-like elements having stretchable chords that connect the tension absorbing components through orifices attached to the exterior shell, while the base of the tension absorbing components rest on the internal body. When the exterior shell moves tangentially from its resting state, the spring-like elements in the direction of the motion compress, while the spring-like elements in the opposite direction expand. When tangential motion ceases, the tension stored by spring-like elements is released, and the stretchable chords recover their resting states, and tension absorbing components return the exterior shell to the resting state. In a further embodiment, a restoration modality may be composed of rods with springs in them, with rollers at the end that move along a surface of the internal body. In an embodiment these rods with springs "snap-back" after movement, to reposition the exterior shell over the internal body in the resting state. In another embodiment these rollers may be magnetized. Even more preferably, the restoration modality may be supplemented with the production of at least one electronic motor. The at least one electronic motor may move the exterior shell with mechanisms that include hinges, shafts, or rotors, or a combination thereof, to ensure proper resting state position.

In a further embodiment, there are provided novel energy dissipation components to augment the energy dissipation of negative torque. Non-magnetic metal rings may be configured to surround one or more internal magnetic force emitters, and as interior-facing magnetic flux approaches the internal body the interior-facing magnetic flux intersects the metal rings and induces eddy currents that dissipate kinetic force of the exterior shell's movement.

There has thus been outlined, rather broadly, the more important features of the invention in order that the detailed description thereof that follows may be better understood and in order that the present contribution to the art may be better appreciated. It responds to concussion-causing collision events with active forces that counteract head rotations.

The invention is not limited in its application to the details of construction and arrangements of the components set forth in the descriptions herein or illustrated in the drawings. The invention is capable of other embodiments.

It is to be noted, however, that the appended drawings are not to scale and illustrate only typical embodiments of this disclosure, and are therefore not to be considered limiting of its scope, for the apparatus, kits, and methods of the disclosure may admit to other equally effective embodiments.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. In describing the invention, it will be understood that a number of techniques and steps are disclosed. Each of these has individual benefit and each can also be used in conjunction with one or more, or in some cases all, of the other disclosed techniques.

The present disclosure is to be considered as an exemplification of the invention, and is not intended to limit the invention to the specific embodiments illustrated by the figures or description below. In particular, the disclosure describes helmets used in U.S. football. The same problems can arise in other endeavors where helmets are used. These include ice hockey, particularly the position of goalie; motorcycle riding; and military use.

Figure 1A:
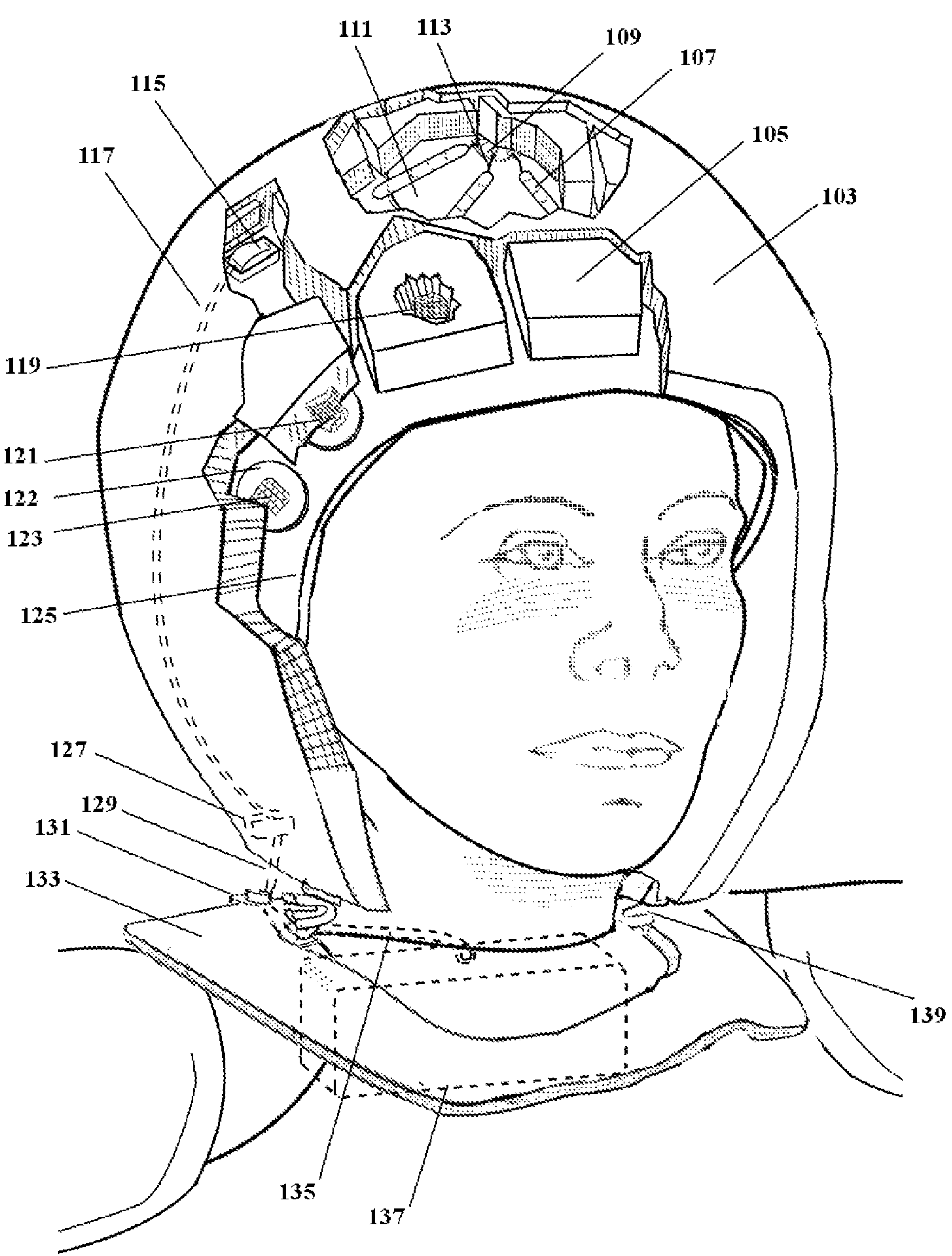
FIG. 1A is an illustration of the invention, with cutaways to show each component therein.

FIG. 1A illustrates a user wearing an RDH as disclosed. External magnetic force emitters 119 composed of arrays of tiny magnets are configured in pads 105 of the exterior shell 103, and internal magnetic force emitters composed of arrays of tiny magnets 123 are configurably attached to the interior cover 125, the illustration displaying magnetic force emitters as they are incorporated by reference from U.S. patent application Ser. No. 17/845,780 and prior U.S. patent application Ser. No. 16/689,086 which is now U.S. Pat. No. 11,464,270. The interior-facing magnet flux extending inwards of external magnetic emitters 119 and the interior magnet flux extending outwards of internal magnetic force emitters 123 are axially aligned 121 in a resting state. Magnetic flux interactions are further disclosed in FIGS. 2A & 2B. Magnetic energy dissipation rings 122 are attached around internal magnet force emitters 123 and are further disclosed in FIG. 3. A magnetic flux motion sensor system is composed of a motion sensor 115, and, as shown in dotted lines, a connection line 117 that communicates sensed motion data to a controller 127, which is connected to an airbag inflator 131 that is connected 135 to a chamber 137 with contents that inflate airbag 133. The magnetic flux motion sensor system is more fully disclosed in FIGS. 5, 6, & 7, and the airbag and airbag deployment process are more fully disclosed in FIGS. 8 & 9. The RDH post-collision restoration system is composed of tension absorbing components 107, with orifices 109 in which stretchable chords 113 are configured to connect the tension absorbing components 107 which are spread around cylinder 111 on the head cover 125. The RDH post-collision restoration system is disclosed in more detail in FIGS. 10A & 10B. Other methods to restore the helmet shell include mechanisms 139 located below the head, attached to the bottom of the helmet shell. These absorb energy, and may include motors to move the helmet shell. The RDH mechanisms below the head are disclosed in more detail in FIG. 11.

Figure 1B:
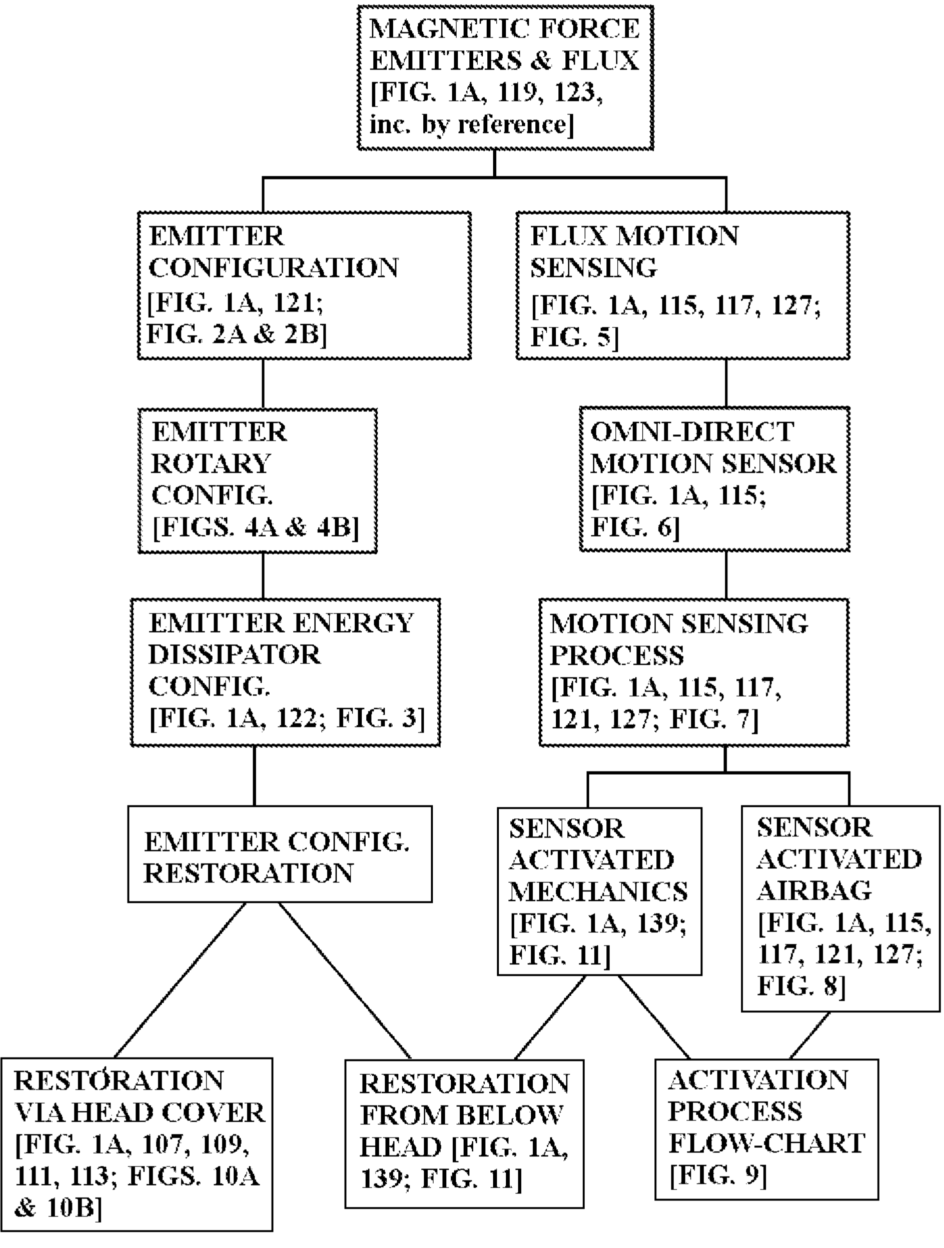
FIG. 1B is a flowchart that shows how components of the invention are linked and nested.

FIG. 1B is a flowchart of the current application, showing how various figures and embodiments are linked and nested in the disclosure. Magnetic force emitters produce magnetic flux; emitter configuration and magnetic flux are intrinsically linked yet can be distinctively articulated to best reveal nested configurations and processes. Magnetic force emitter configurations are disclosed in FIGS. 1A, 2A & 2B, 3, 4A & 4B, and 10A & 10B. Magnetic flux motion sensing processes, including sensor activated airbag deployment, are disclosed in FIGS. 1A, 5, 6, 7, 8, 9, and 11. FIG. 1B flowchart elements include the reference numbers that point to components on FIG. 1A as well as listing the figures in this application that disclose each component in detail.

Figure 2A:
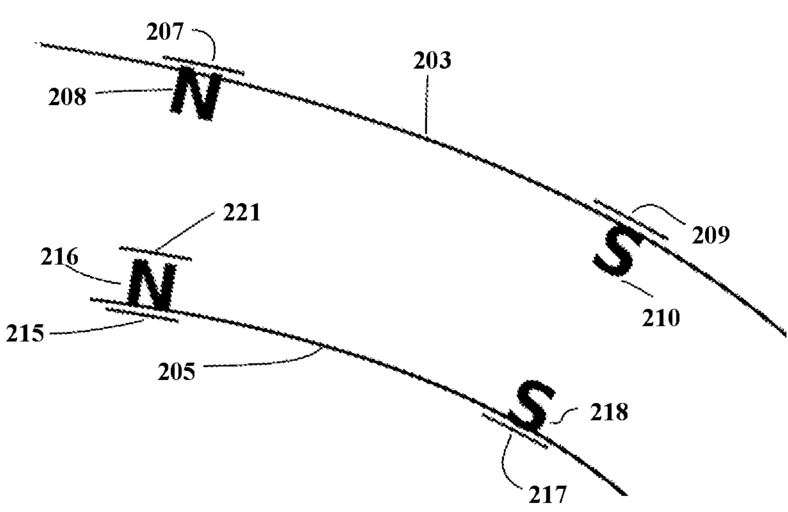
FIGS. 2A & 2B are schematic illustrations of how magnetic flux induces torque that dampens the transmission of rotational acceleration to the internal body.

FIG. 2A illustrates a side view schematic diagram of an exterior shell 203 and an internal body 205. In an embodiment external magnetic force emitter 207 attached to the exterior shell 203 emits magnetic flux 208 with N polarity axially towards an internal magnetic force emitter 215 attached to the internal body 205 emitting magnetic flux 216 with N polarity. External magnetic force emitter 209 adjacent to external magnetic force emitter 207 emits magnetic flux 210 with polarity S axially towards respective internal magnetic force emitter 217 attached to the internal body 205 that has magnetic flux 218 with polarity S facing out. A internal magnetic force emitter attached to the internal body may have a barrier 221 which is not permeable to magnetic fields.

Figure 2B:
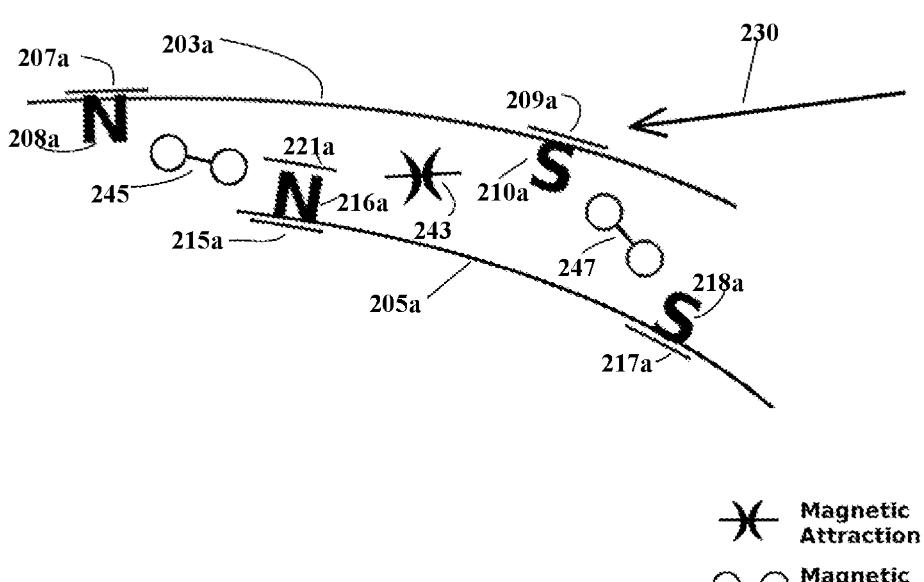

FIG. 2B illustrates a side view schematic diagram of an embodiment wherein helmet shell 203*a* has received a tangential blow 230 that accelerates helmet shell 203*a* to rotate and translate in the direction of the impact force impulse. External magnetic force emitter 209*a* has a rotated and translated position such that it approaches internal magnetic force emitter 215*a*, with magnetic flux 210*a* and magnetic flux 216*a* inducing magnetic attraction 243, which causes internal magnetic force emitter 215*a* to move in the opposite direction of the tangential blow. Simultaneously, magnetic flux 208*a* from external magnetic force emitter 207*a* generates magnetic repulsion 245 with magnetic flux 216*a* below the level of barrier 221*a*. This drives internal magnetic force emitter 215*a* further in the opposite direction. All magnetic force emitters attached to helmet shell 203*a* move together. Magnetic flux 210*a* which rotates towards magnetic force emitter 215*a* generates magnetic repulsion 247 with magnetic flux 218*a* that pushes internal magnetic force emitter 217*a* in the opposite direction, amplifying the negative torque on the internal body 205*a*.

Figure 3:
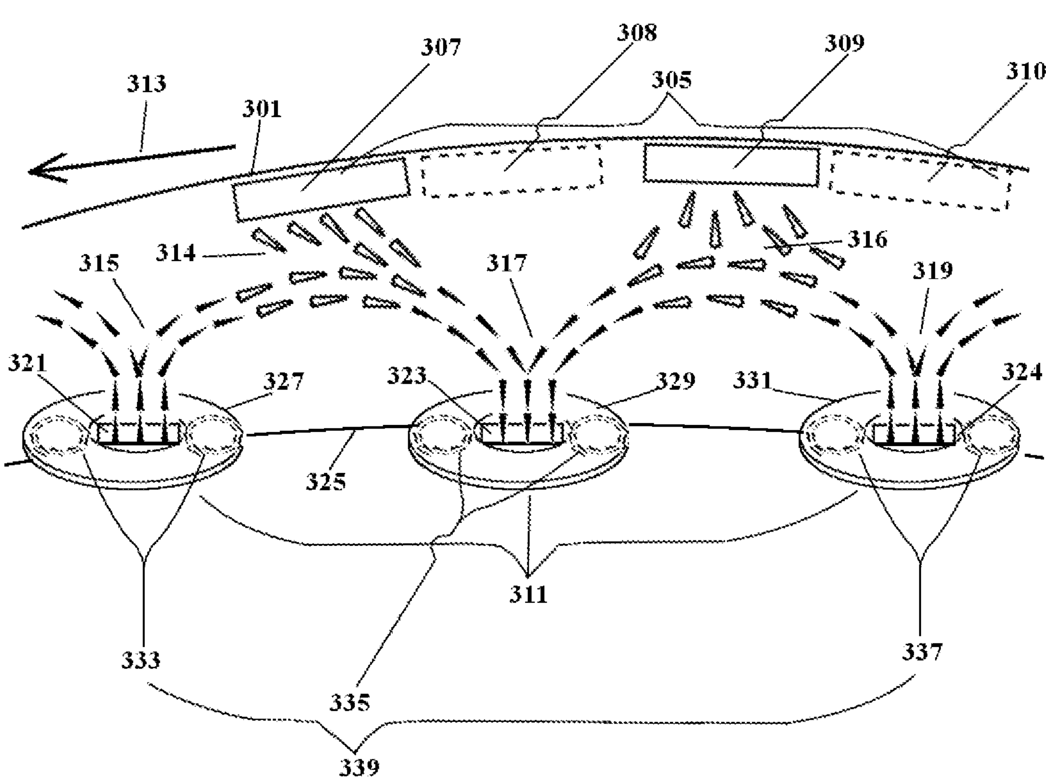
FIG. 3 is a schematic illustration of how non-magnetic metal rings surrounding internal magnetic force emitters dissipate kinetic energy.

FIG. 3 illustrates how magnetic force energy displacements dampen transmission of rotational motion to the internal body. When a magnetic field quickly moves towards copper (or other metals) it sets up electrical eddy currents, which dissipate kinetic energy. For each individual metal ring 327, 329, and 331 the eddy currents are small. But as all magnetic force emitters 305 attached to the helmet shell 301 move as an ensemble, although individual magnetic force emitters 307 and 309 are separated by 4, 5, 6 or more cm's, the aggregate energy dissipation from the ensemble of metal rings 311 is significant. As the helmet shell 301 rapidly rotates in the direction of the arrow 313, helmet shell magnetic force emitter 307 and magnetic flux 314 and magnetic force emitter 309 and magnetic flux 316 rapidly move from initial positions 308 and 310 respectively. Magnetic fluxes 314 and 316 intersect magnetic fluxes 315, 317, and 319 from magnetic force emitters 321, 323 and 324 respectively, attached to internal body 325. As neighboring magnetic fluxes 314 and 316 alternate in their polarity facing the internal body 325, and as neighboring magnetic fluxes 315, 317, and 319 alternate in their polarity facing the helmet shell 301, the magnetic fluxes intersecting metal rings 327, 329, and 331 induce counter-clockwise eddy currents 333, 335, and 337. The ensemble of eddy currents 339 dissipate the kinetic force of the helmet shell 301 movement.

The dissipation can be measured using the electromotive force £, which is calculated with the change in magnetic flux $\Delta\Phi$ that occurs as the helmet shell magnetic emitters move across the internal body magnetic emitters, $\varepsilon=\Delta\Phi/\Delta t$. Helmet rotations are fast, which increases ε value. ε is thus the magnetic flux area B(L) change in a period t. The current I that is generated from the resistance to ε is:

$$I=\varepsilon/R=BLv/R$$

where v is the voltage of the current that rises in opposition, and R is the resistance of the metal. Kinetic energy $E_k$ dissipated in the resistance:

$$E_k=I2R=(BLv/R)2R$$

As an example, consider a helmet shell magnetic force emitter that moves from position 0.04 cm to 0.07 cm in 0.05 s.

$$\varepsilon[0.07\text{ cm}-0.04\text{ cm}](0.03\ \pi\text{m}^2)/0.05\text{ s}=0.0003\ \pi\text{V}$$

$$I=\varepsilon/R=0.0003\ \pi\text{V}/0.002\ \Omega=0.15\ \pi A=0.47\ A$$

where R (0.002Ω) is twice the resistance of a 0.01 $m^2\pi$ cooper ring.

This generates very little electricity. The aggregated current of an ensemble of 12 metal rings remains small. However, because it occurs over a brief period, 0.05 s, the kinetic energy dissipated is not negligible. This adds to the negative torque delivered to the helmet cover, which dissipates even more energy.

Figure 4A:
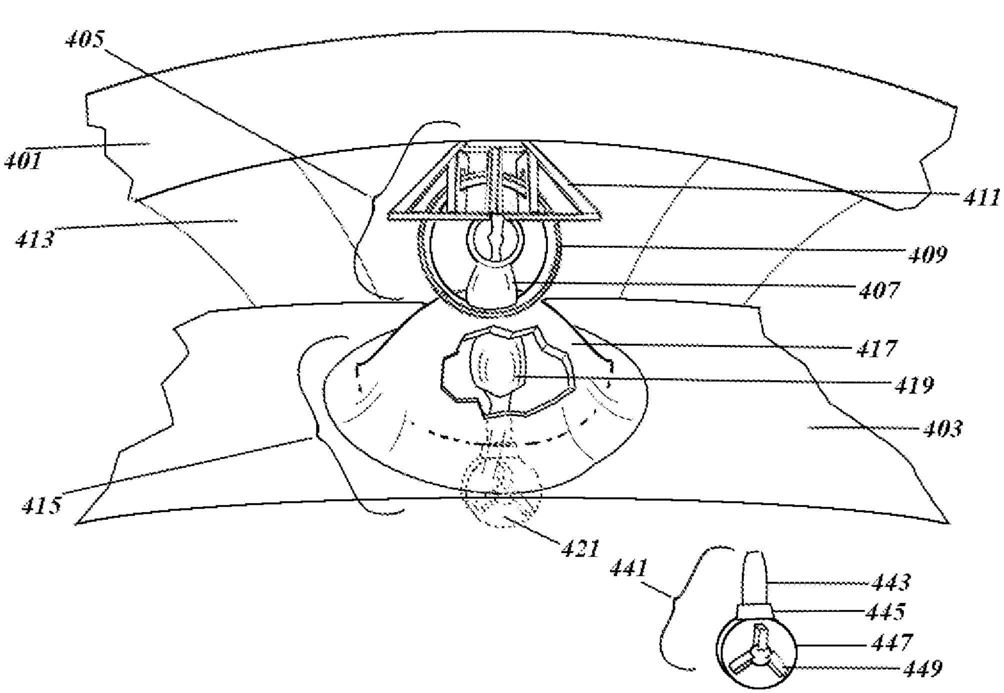
FIGS. 4A & 4B illustrate an attachment system for magnetic force emitters.
Figure 4B:
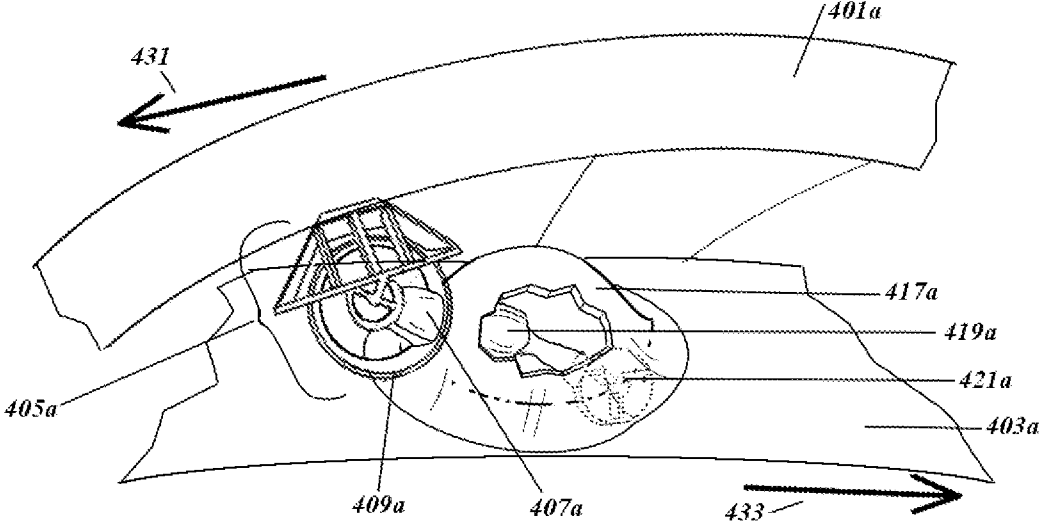

FIGS. 4A & 4B illustrate an embodiment with a rotary housing to reduce rotational force transmission to the head of a user of an RDH helmet. FIG. 4A shows the rotary housing comprising at least one first unit 405 configured with an external magnetic force emitter 407 that rotates on a spindle in a cylindrical structure 409 which is attached via a housing 411 to the interior 413 of the helmet shell 401, and at least one second unit 415 with a barrier 417, quasi-spherical shaped, that is attached to the internal body 403, and under the barrier an internal magnetic force emitter 419 is attached at a base 421 (visible as dotted lines) to the internal body 403, the base 421 capable of rotating and thereby pushing on the internal body 403. The external magnet magnetic force emitter 407 with a polarity facing the head cover 403 that is opposite of the polarity of the internal magnet force emitter 419 polarity facing the helmet shell 401, and the external magnetic force emitter 407 and the internal magnetic force emitter 419 are aligned in a resting condition. The cylindrical structure 409 and the barrier 417 each have outside surfaces composed of a material such as polytetrefluoroethylene to slide with very little friction. The base shown in dotted lines 421 is illustrated at 441 composed of a thrower link 443 that connects to the internal magnet force emitter 419, the thrower link 443 being connected at 445 to an impeller 447 configured with impeller contacts 449 which are positioned in the internal body 403 such that when the impeller 447 moves it pushes the internal body 403.

FIG. 4B illustrates the result of a tangential motion 431 that causes helmet shell 401*a* to rotate and translate on the RDH user's head, the first unit 405*a* cylindrical structure 409*a* moves down the side of the barrier 417*a*, causing the magnet flux of the external magnetic force emitter 407*a* and the magnetic flux of the internal magnetic force emitter 419*a* to form an magnetic attraction dipole which rotates the internal magnetic force emitter 419*a* such that the base 421*a* pushes the head cover 403*a* in a negative torque direction 433 opposite to the helmet shell's tangential motion 431, thereby transmitting negative torque as an energy damping force to the internal body 403*a* in response to tangential motion 431 of the helmet shell 401*a*. In a further embodiment illustrated in FIG. 4A, the cylindrical structure 409 itself rotates, and is attached via housing 411 to the interior 413 of the helmet shell 401, with the external magnetic force emitter 407 in the cylindrical structure 409 moving in accordance with the cylindrical structure 409 rotation.

Figure 5:
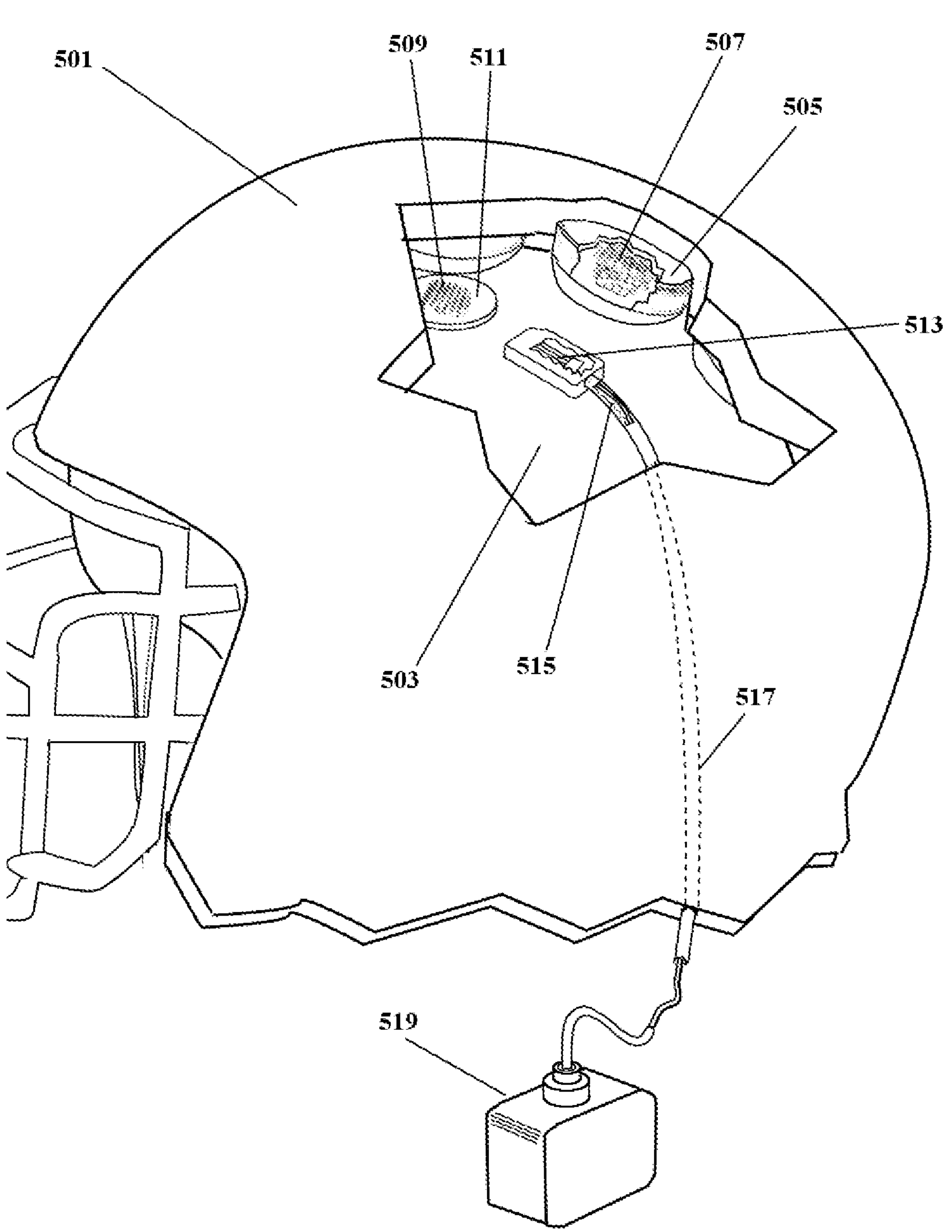
FIG. 5 is an illustration of the invention, with a cutaway to show motion sensor configuration.

FIG. 5 illustrates a helmet shell 501 cut open, to reveal an embodiment with an internal body 503 on which a motion sensor 513 is configured below an external magnetic force emitter 507 that is embedded in a cushion pad 505 attached in the helmet shell 501. Also shown is an internal magnetic force emitter 509 located on an internal body 503 which will torque negatively to the helmet shell 501 motion, with a metal ring 511 that dissipates transmitted magnetic force. When the helmet shell 501 moves tangentially the magnetic flux associated with the external magnetic force emitter 507 moves across the motion sensor 513 which detects a rate of acceleration of the magnetic flux. The motion sensor 513 transmits data in a data line 515 through a connection 517 to a controller 519 that can record, process, and trigger a response to the data. In another embodiment the motion sensor transmits data wirelessly to a controller or receiver on the player or elsewhere.

Using Hall effect sensors, magnetic fields can be continuously measured. A sudden surge due to tangential collision will have an established pattern. The sensor can immediately trigger a response to an extreme rotation situation. The output signal from a Hall effect sensor is the function of a magnetic field density around the device. The velocity at which a magnetic flux moves is measured by the frequency of the magnetic field density amplitude changes. When the magnetic field density around the sensor reaches or exceeds a predetermined risk level, the frequency reaches or exceeds a predetermined threshold, and the sensor generates an output voltage called the Hall Voltage. Hall effect sensors are more reliable than mechanical switches, and do not suffer from environmental impacts, a key attribute in a helmet that receives severe contact. They can be flat, have no moving parts, and are highly sensitive to magnetic fields. This provides a tool for medical professionals and scientific researchers to monitor, assess, and address helmet shell movement.

Figure 6:
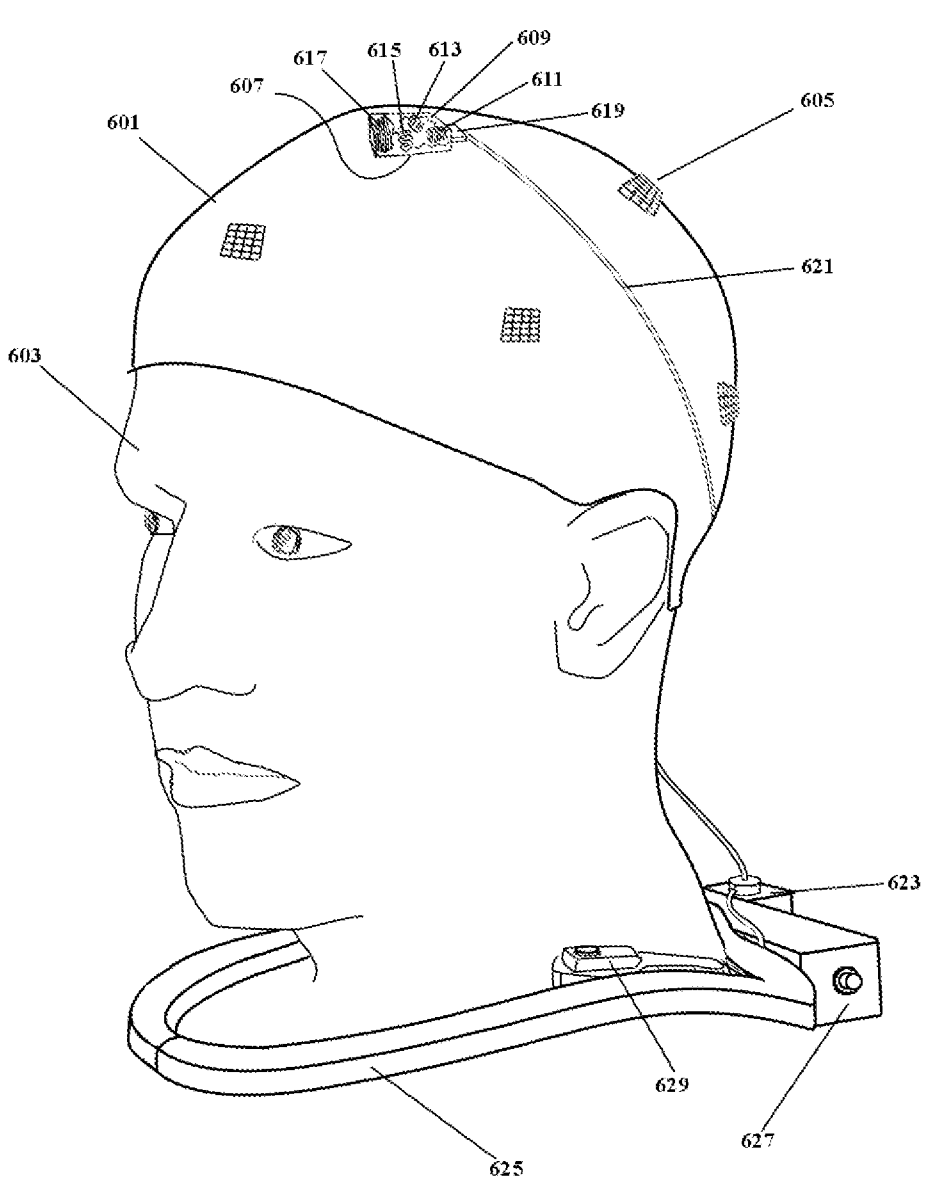
FIG. 6 is an illustration of the motion sensor configuration.

FIG. 6 illustrates an embodiment with an omnidirectional motion sensor. In the embodiment the sensor is configured with three more or less orthogonal coils and electronics to integrate the coil signals. As the helmet shell rotates over the orthogonal axes, spherical harmonics (θ which measures rotation from apex down, ϕ which measures rotation around the equatorial plane) are solved. The general solution $V_H$ of a spherical helmet's movement is a linear combination of the spherical harmonic functions multiplied by an appropriate scale factor (the helmet shell radius.)

$$V_H(\theta,\phi)=\sum_{l=0}^{\infty}\sum_{m=-1}^{l}c_{lm}r_lY_{lm}(\theta,\phi)$$

where $c_{lm}$ are constants and the factors $r_l$ and $Y_{lm}$ are regular solid harmonics, expanded below.

$$c_{lm} = \int Y_{lm}(\theta, \phi) \mathrm{V}_H(\theta, \phi) d0$$

$$Y_{lm}(\theta, \phi) = \sqrt{\frac{2l+1}{4\pi} \frac{(l-m)!}{(l+m)!}} P_l(\cos\theta) e^{im\phi}$$

$Y_{lm}$ scales with the radius of the helmet. P represents a set of orthogonal polynomials, often Legendre polynomials, which do not require differential equations. The polynomials are complete, and all coefficients can be predetermined. Because the helmet is not a ball, there are non-linear effects. Precision of $10^{-4}$ requires sensor cards to handle up to 200 parameters per sensor card, although many of these are constant, common, or depend on others. Cards such as Siemens KSY44 are sufficient, robust, extremely thin, and can be rapidly calibrated.

In the FIG. 6 embodiment an internal body 601 worn by a user 603 is configured with internal magnetic force emitters such as 605 and an omnidirectional orientation sensor 607 which is composed of a container 609 and, viewed in cutaway, X-axis 611, Y-axis 613, and Z-axis 615 coils and easily calibrated sensor cards 617. Integrated electronics 619 process input signals transmitted through connector 621 to controller 623. Internal magnetic force emitters such as 605 are positioned to torque orthogonally to the interior-facing magnetic fluxes during a collision. In this embodiments the linear output is directly proportional to the applied magnetic field. Orientation sensor 607 may be further configured with amplification material that enhances measurements. Orientation sensor 607 can rapidly detect the external shell's acceleration in at least three orthogonal directions. Orientation sensor 607 may be a magnetic field sensor, such as a Hall effects sensor, or other sensors such as position, velocity, accelerometer, or gyroscopic devices. Uninflated airbag neck component holder 625 snaps around the user's neck, and contains the uninflated airbag component. Gas generators or compressed gas, which may comprise tablet formulations and other compositions known in the art, are incorporated into inflator unit 627. Hybrid and pressurized gas inflators may also be employed in a known manner. From the time the orientation sensor 607 detects the collision to the time the air bag is fully inflated is only 30 milliseconds, or 0.03 second. In 0.03 second, about 1.3 inches of rotational movement may occur. This is less than the rotational distance of an ordinary collision, and significantly less than the distance induced by a severe collision. In a further embodiment a sensor 629 is located below the head, at its base, such as on the shoulder area close to the neck. The sensor detects an interior-facing magnetic flux from an external magnetic emitter attached to the helmet shell in a position proximate to the sensor location, such as beneath the helmet shell ear slot. If a tangential impact causes the entire head to pass a threshold of rotational acceleration, the sensor below the head may detect this, leading to a process that triggers the airbag inflator.

Figure 7:
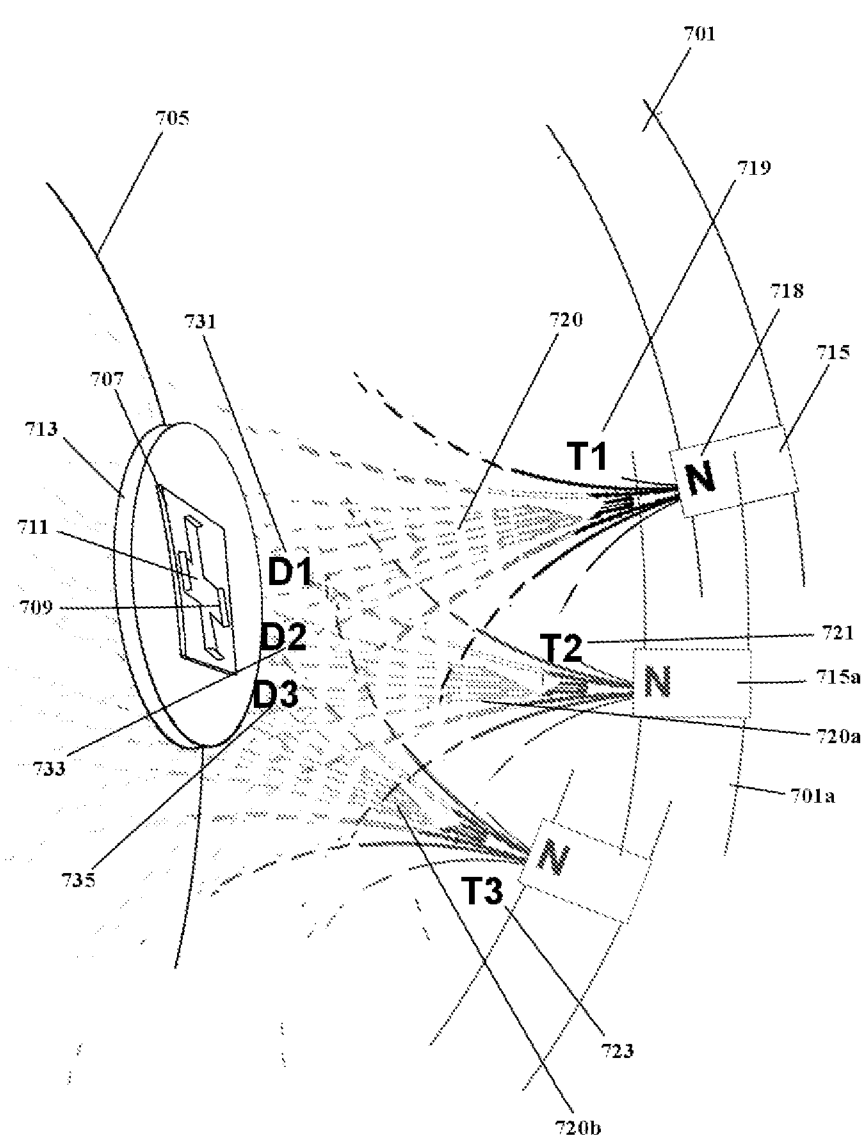
FIG. 7 is a schematic illustration of the motion sensor system operation.

FIG. 7 is a schematic illustration of an embodiment in which a CMOS sensor 707 is used because of its sensitivity and low cost. The sensor 707 has a rotation invariant geometry, with an N-well 709 in a P-substrate 711. Because stress changes the electrical resistance of Silicon [Si] by changing its resistivity, deformations of the sensor can induce mechanical stress that may change the magnetic sensitivity. To prevent this, the sensor 707 rests on a solid base 713, to prevent sensor 707 from bending. Sensor 707 output voltage is directly proportional to the applied magnetic field. In the CMOS setup, the output voltage equation is:

$$\mathrm{V}_H = G \cdot \frac{r_H}{qn \cdot h} \cdot |B|$$

G is the geometrical correction factor, $^r$H of Si=1.15 (the scattering factor), n is the doping factor, h is the thickness of the n-well, and B is the applied magnetic field.

Helmet shell 701 external magnetic force emitter 715 has interior-facing magnetic flux 720 polarity N 719 facing the internal body 705 directly over sensor 707 in resting state T1 719. This corresponds to sensor 707 detected field D1 731. During a tangential collision, the helmet shell 701 rotates to position 701*a* as the external magnetic force emitter 715 accelerates at a given rate to position T2 721, reaching position 715*a* as interior-facing magnetic flux moves to 720*a*, the acceleration corresponding to detected field density D2 733, and at position T3 723 interior-facing magnetic flux 720*b* has rotated at a given acceleration rate that corresponds to detected field density D3 735. The rate of change of density fields D2 and D3 is compared to predetermined acceleration rates and may trigger a compensation method, data recording, and/or data transmission.

Figure 8:
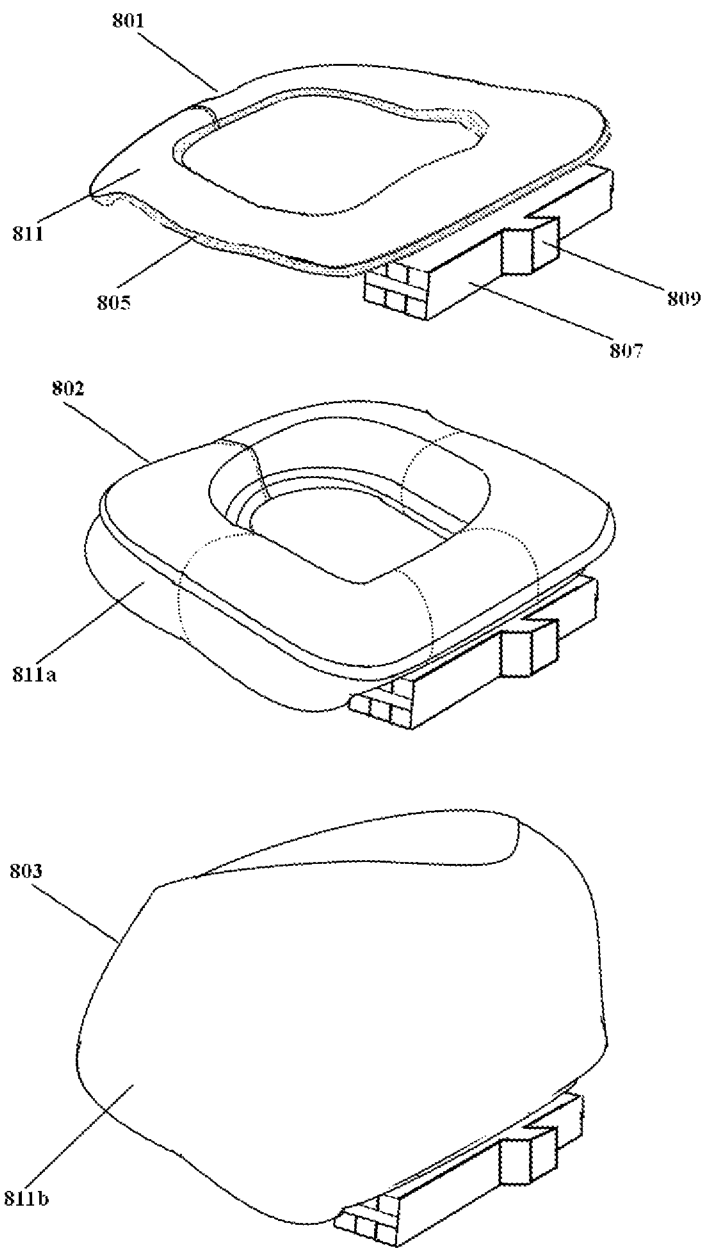
FIG. 8 illustrates an airbag deployment.

FIG. 8 illustrates an embodiment in which a concussive acceleration is detected, and controller 809 triggers airbag inflator 807 positioned proximate to a helmet, connected to a neck yoke 805 composed of airbag 811. At resting state 801 airbag 811 is uninflated. At beginning state 802 airbag 811*a* begins to inflate. At filled state 803 airbag 811*b* is filled, prior to deflation. This fills the empty space between a user and the helmet's elements, and prevents neck muscles from twisting, or in other ways maintains a user's head from moving rapidly.

Figure 9:
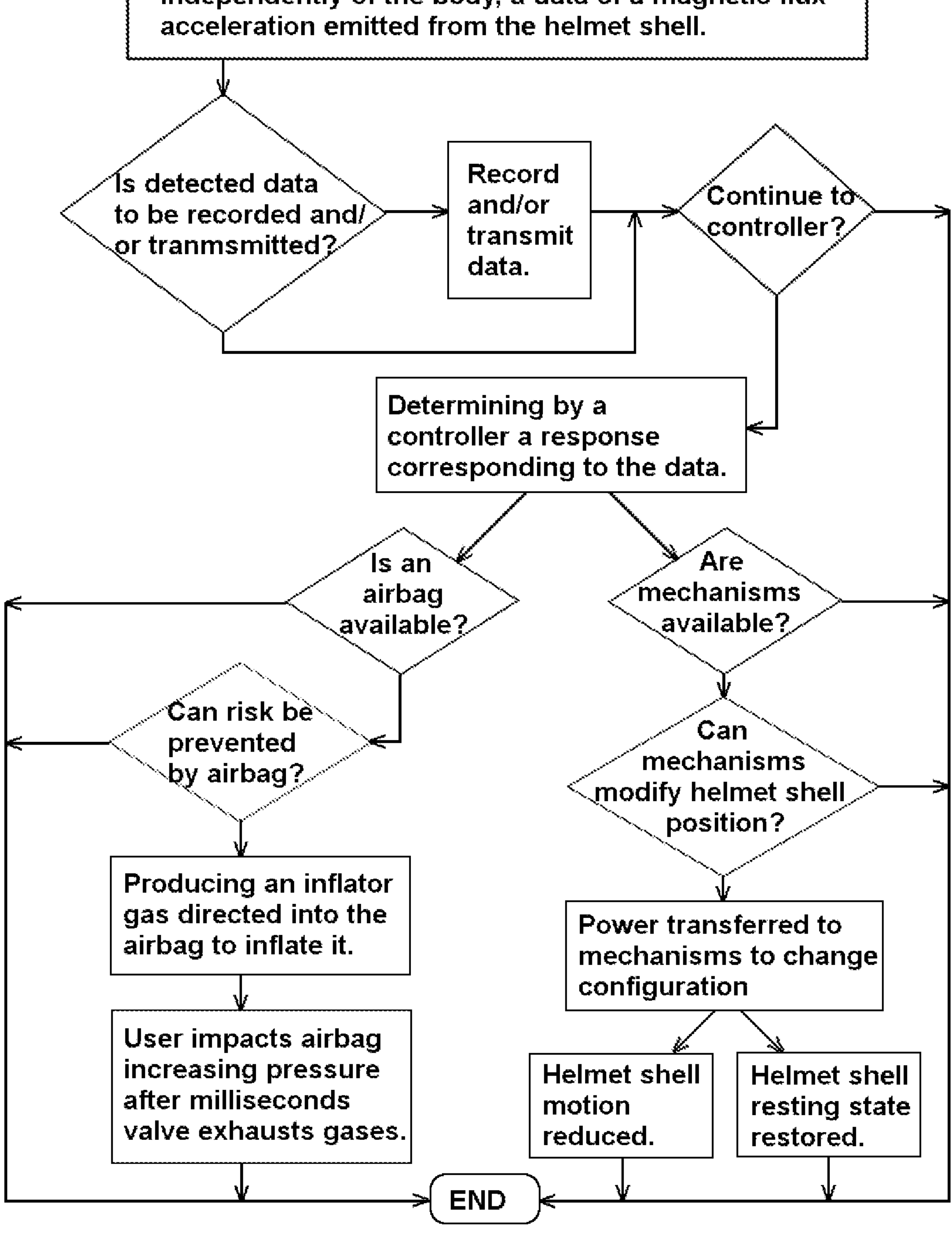
FIG. 9 is a flowchart that shows the logic of the airbag deployment process.

FIG. 9 schematically depicts a flow chart which illustrates by way of example an operation of the sensor embodiment. The helmet shell's independent motion is detected by sensors as a data of a magnetic flux acceleration rate. The data may be recorded and/or transmitted, or not. This may complete the action of the sensor embodiment. In a further embodiment, a controller may activate an airbag and/or expansion mechanisms.

If an airbag is available, the controller determines a concussion risk corresponding to the data. If a concussion risk threshold is reached, the controller may activate the air bag inflator circuit. The airbag inflation occurs in 30 milliseconds or less, which is the current tolerance for side curtain air bag deployments in vehicles. The RDH helmet user's head, or the helmet shell, impacts the airbag which increases pressure in the airbag, or a predetermined delay occurs, either of which causes a relief valve to open and exhaust inflation gases.

If expansion or energy absorbing mechanisms are available, a controller logic element determines if helmet shell motion can be modified by one or more mechanisms, and if so, a power source changes their configuration. The mechanisms help reduce the helmet shell motion and/or restore the helmet shell to a resting state.

Figure 10A:
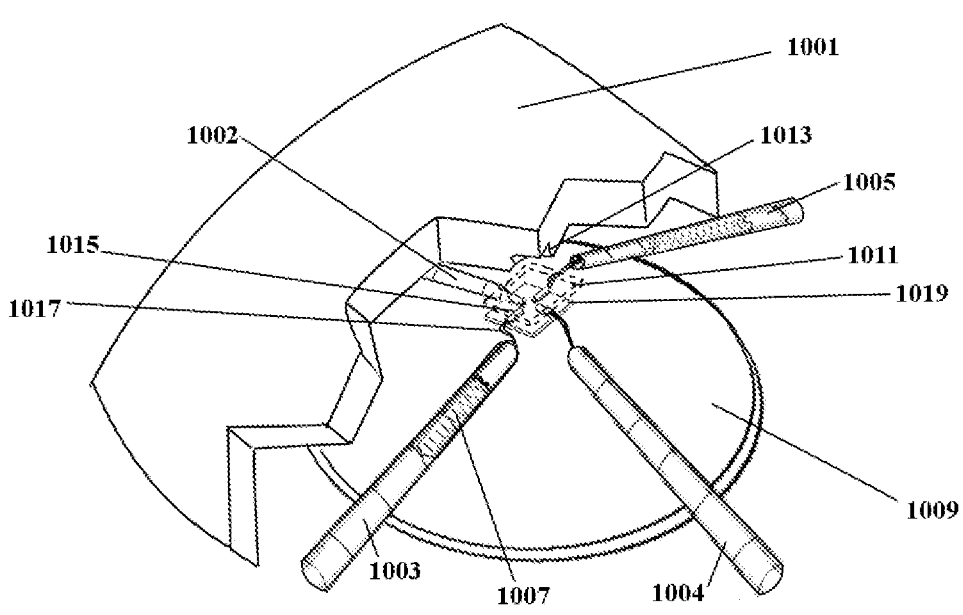
FIGS. 10A & 10B illustrate the helmet restoration system.
Figure 10B:
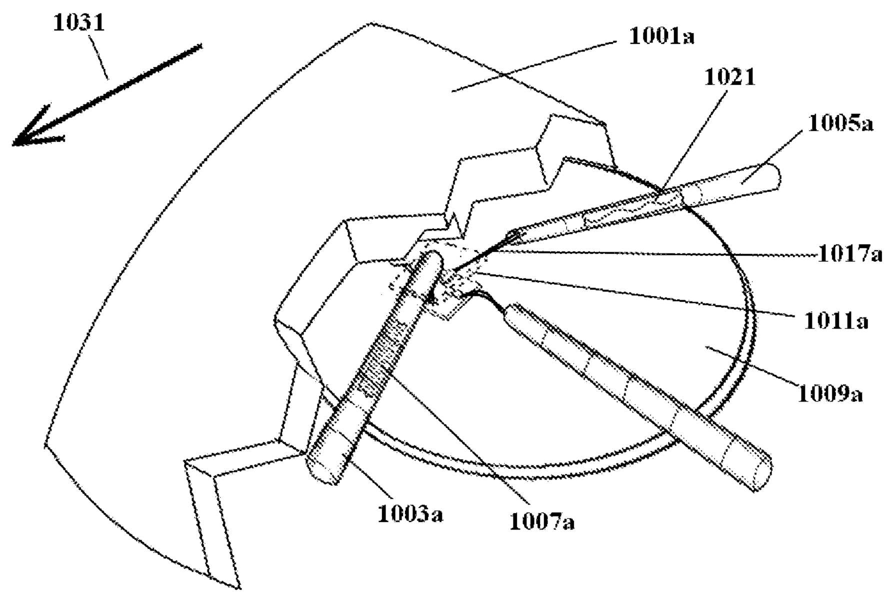

FIGS. 10A & 10B illustrate a preferred embodiment with a helmet shell restoration system which serves to return the helmet shell to its resting state position after a tangential impact causes the helmet shell to rotate and translate.

FIG. 10A illustrates the helmet shell in a resting position, not during a tangential impact. Helmet shell 1001 is configured with container insert 1011 that contains component 1019 and is attached in the helmet shell 1001 at 1013, component 1019 connecting tension absorbing elements 1002, 1003, 1004, and 1005 each with stretchable chords 1017 via orifices 1015. Each of the tension absorbing elements 1002, 1003, 1004, and 1005 have a spring-like element 1007 seen in cutaways. The base of each element is constrained in movement by cylinder 1009 on the internal body.

FIG. 10B illustrates the embodiment after a tangential impact in direction of arrow 1031. Stretchable cords 1017*a* connecting tension absorbing elements such as 1003*a* and 1005*a* are placed under tension sufficient to cause spring-like elements such as 1021 to expand. As helmet shell 1001*a* moves tangentially, container 1011*a* moves correspondingly and pushes down, and tension absorbing elements such as 1003*a* contain a spring-like element 1007*a* that compresses. The cylinder 1009*a* is employed to prevent forward motion of elements such as 1005*a*. When tangential motion ceases, the tension stored by spring-like elements such as 1007*a* is released, and the stretchable chords such as 1017*a* recover their resting states, returning container 1011*a* to its resting position.

Other methods may be used to urge the helmet shell to return from a second state in which it has been moved by external impact to the first, resting state. These include an embodiment with a spring assembly biased to maintain the helmet shell in the first resting state. When the helmet shell is tangentially impacted with force to overcome the biased state and the helmet shell moves relative to the head cover, the spring assembly acts to return the helmet shell back to the first, resting state. Another embodiment uses a toothed wheel, which is engaged with a finger from the helmet shell in a first, resting state, and which rotates to a second state when the helmet shell moves relative to the head cover, and the wheel is configured to return to the first resting state. In a further embodiment, as illustrated in FIG. 11, mechanisms 1103*a*, 1103*b*, and 1103*c* may restore the helmet shell to the first, resting state after helmet shell movement.

Figure 11:
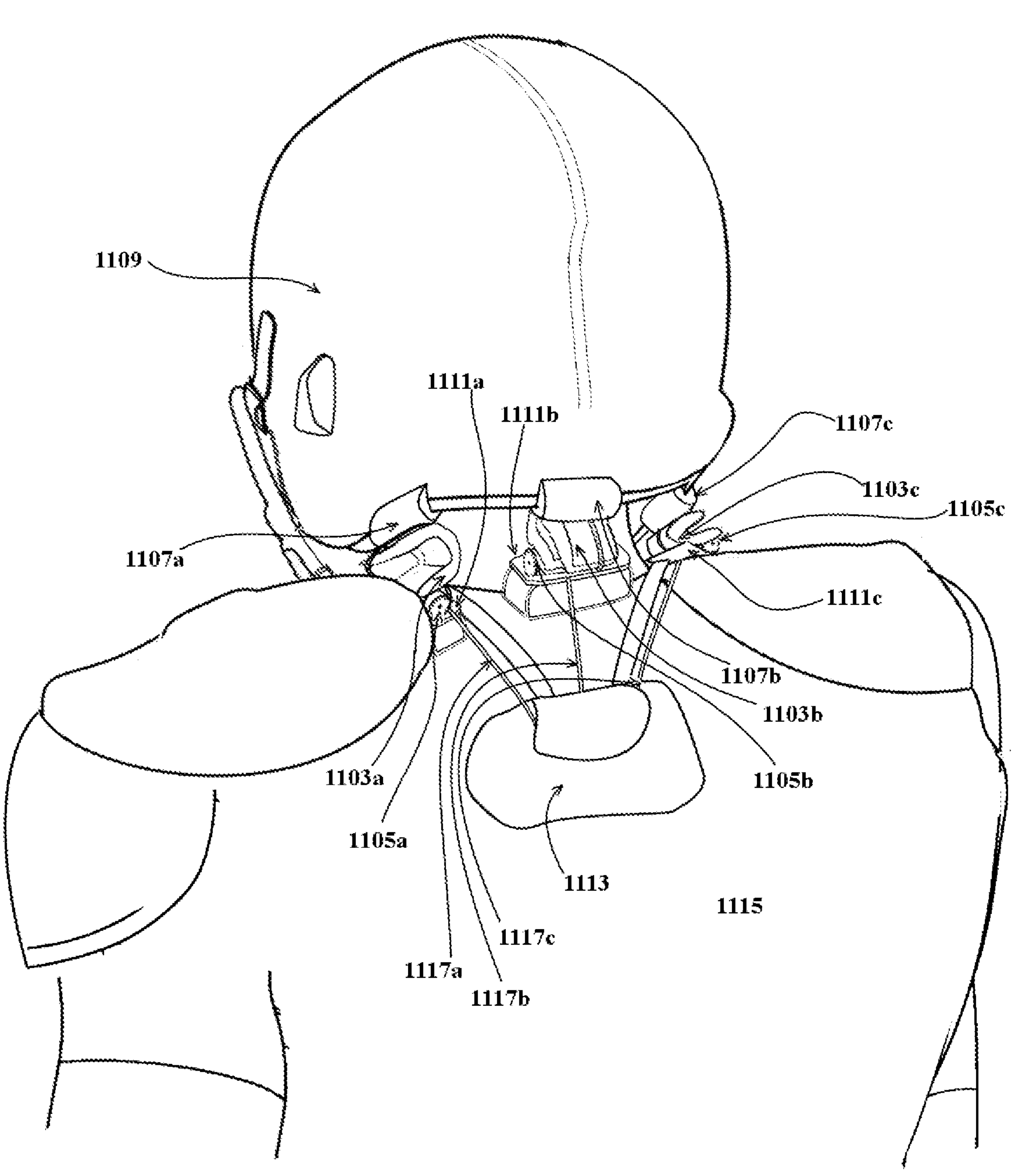
FIG. 11 illustrates a mechanical response system.

FIG. 11 illustrates an embodiment wherein mechanisms 1103*a*, 1103*b*, and 1103*c*, composed of materials such as polymers able to perform rapid conformational changes, are configured to dampen helmet shell motion to limit head movement injury, and/or return the helmet shell to a resting state. In other embodiments mechanisms 1103*a*, 1103*b*, and 1103*c* may be hinges, pistons, or other structures capable of compression and expansion. In an embodiment, when a tangential impact causes the helmet shell to rotationally accelerate, mechanisms 1103*a*, 1103*b*, and 1103*c* dampen the motion. In another embodiment, motors 1105*a*, 1105*b*, and 1105*c*, or in other embodiments an electromagnetic source, power a change in the configuration of one or more mechanisms 1103*a*, 1103*b*, and 1103*c* to move one or more attachment units 1107*a*, 1107*b*, and 1107*c*, attached to the helmet shell 1109, thereby changing the distance between the helmet shell 1109 and one or more plates 1111*a*, 1111*b*, and 1111*c*. This may dampen the rotational acceleration of the helmet shell 1109, or return the helmet shell 1109 to the resting state. Mechanism 1103*a* is shown in an expanded state, while mechanism 1103*b* is shown in a retracted position. The controller and power source are in the pack 1113 worn by the player 1115, and are connected to each motor 1105*a*, 1105*b*, and 1105*c* via conduits 1117*a*, 1117*b*, and 1117*c*. The controller includes a logic element that determines mechanism response.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

Disposition of Subject Matter

This is a continuation-in-part application submitted more than one year after the parent application (U.S. patent application Ser. No. 17/845,780) and after the grandparent application, now a patent (U.S. Pat. No. 11,464,270). The following disclosures and claims are either: 1) provided in a manner as described in the first paragraph of 35 U.S.C. 112 in the prior-filed applications, and therefore have the benefit of grandparent application priority date, marked as A; or 2) are supported by the parent and grandparent applications and disclose nonobvious configurations and mechanisms to further enable them, and therefore have the priority data of this current submission, marked as B.

| Claim | Status |
|---|---|
| 1 | A |
| 2 | B |
| 3 | B |
| 4 | A |
| 5 | B |
| 6 | B |
| 7 | B |
| 8 | B |
| 9 | B |
| 10 | A |
| 11 | A |
| 12 | A |
| 13 | A |
| 14 | A |
| 15 | A |
| 16 | A |
| 17 | B |
| 18 | B |

The grandparent application provided detailed disclosures of tiny magnets assembled as three-dimensional arrays that amplify magnetic flux in a single polar direction. It showed how these assemblies may be configured in a helmet and on a head cover. Both the parent and grandparent applications disclose how magnetic flux interactions induced by assemblies in a helmet and on a head cover cause negative torque through repulsive magnetic flux interactions that dampen rotational acceleration. This application provides new configurations of the parent and grandparent disclosures to maximize their effect. The compound magnetic emitters in the previous applications can be arranged to amplify negative torque by harnessing both magnetic flux attraction and repulsion; they may be spread apart at certain distances. As this involves the grandparent disclosure arranged in a more effective pattern, it is anticipated that these claims 1, 10, 11, & 12 will have the same priority date as in the grandparent application.

A novel, nonobvious modification of the parent and grandparent applications is also included in this application, namely a non-magnetic metal ring that may surround an internal magnetic emitter to dissipate energy transmitted by an interior-facing magnetic flux generated by an external magnetic emitter. It is anticipated that this claim 2 will have a priority date concurrent with the submission date of the current application. Also included is a novel, nonobvious housing for the external magnetic emitters and an associated novel, nonobvious attachment for the internal magnetic emitters, which allows a counterintuitive use of magnetic attraction interaction to directly transmit negative torque motive force to the internal body. It is anticipated that this claim 3 will have a priority data concurrent with the submission date of the current application.

The grandparent and parent applications disclosed the limitation that the helmet shell, after being moved relative to the internal body, returned to a first, resting state. This application provides a configuration, namely a biased spring, that expresses the functions described in earlier applications. It is anticipated that this claim 4 will have the same priority date as in the grandparent application. Novel, nonobvious systems and methods to perform this function are also introduced, in claims 5, 6, & 7. It is anticipated these claims will have a priority data concurrent with the submission date of the current application.

A novel, nonobvious system and method to dampen rotational acceleration uses energy-absorbing structures. It is anticipated that claims 8 & 9 will have a priority date concurrent with the submission date of the current application.

A previously disclosed subject matter in the parent and grandparent applications, in their specifications and claims, described magnetic sensor systems and methods to use the sensor data to trigger an airbag about the user's head, including figures. Claims concerning the sensors and airbags were withdrawn after a restriction requirement. They are herein reintroduced in claims 13, 14, 15, and 16. It is anticipated that these claims will have the same priority date as when they were introduced in the grandparent application.

A novel, nonobvious use of the magnetic sensor system is also included in this application, namely the sensor data is used to restore and reposition the helmet shell to its first, resting state after it has been moved by an impact. The sensor data is also used in a similar system to dampen the movement of the helmet shell or the internal body with a structure that can rapidly change conformation. These uses may incorporate a small motor to power the restoration or damping. It is anticipated that these claims 17 & 18 will have a priority date concurrent with the submission date of the current application.

What is claimed is:

1. A magnetic motion detection system comprising:

a sensor arranged in an internal body worn by a person's head, the internal body positioned inside of a helmet shell;

the helmet shell configuring to emit a magnetic flux and capable of rotating independently of the internal body;

wherein the helmet shell is configured to experience tangential impacts, resulting in a rotational and tangential acceleration of the helmet shell independent of the internal body;

the sensor configured to detect a plurality of acceleration data of the magnetic flux resulting from the rotational and tangential acceleration;

the plurality of acceleration data enables a calculation of the rotational and tangential acceleration.

2. The magnetic motion detection system of claim 1, wherein the controller performs at least one of the following actions: storing the acceleration data of the magnetic flux, and transmitting the acceleration data of the magnetic flux.

3. The magnetic motion detection system of claim 1, wherein the controller generates a triggering signal for an airbag if the acceleration data of the magnetic flux has a value equal to and greater than a predetermined threshold value.

4. The system of claim 3, wherein the triggering signal for the airbag causes an airbag inflator to rapidly inflate the airbag around the person's neck by producing an inflator gas directed into the airbag to inflate it; after predetermined delay opening a valve to exhaust gases.

5. The magnetic motion detection system of claim 1, wherein the controller contains a logic element that, in response to the acceleration rate data of the magnetic flux, is adapted to trigger a rapid conformational change of at least one adjustment mechanism comprising a polymer structure with a spring-like action.

6. The system of claim 5, wherein the adjustment mechanism is coupled to at least one of the following: the helmet shell, in which the conformational change reduces the helmet's motion caused by the impact; and the internal body, in which the conformational change reduces the internal body's motion caused by the impact.

* * * * *